(12) United States Patent
Seid et al.

(10) Patent No.: US 8,172,060 B2
(45) Date of Patent: May 8, 2012

(54) DYNAMIC PRESSURE CONTROL SYSTEM WITH SOLENOID VALVE COMMAND CURRENT TRIMMING

(75) Inventors: David L. Seid, Conklin, MI (US); Hamid Najmolhoda, Grand Rapids, MI (US)

(73) Assignee: Saturn Electonics & Engineering, Inc., Auburn Hills, MI (US)

( * ) Notice: Subject to any disclaimer, the term of this patent is extended or adjusted under 35 U.S.C. 154(b) by 981 days.

(21) Appl. No.: 12/080,569

(22) Filed: Apr. 2, 2008

(65) Prior Publication Data

US 2009/0254255 A1    Oct. 8, 2009

(51) Int. Cl.
F16D 25/12    (2006.01)
F16D 11/06    (2006.01)
G06F 17/00    (2006.01)

(52) U.S. Cl. ......... 192/85.63; 192/52.4; 701/68; 701/60
(58) Field of Classification Search .............. 701/51, 701/58, 60, 67, 68; 192/3.58, 85.63, 48.601, 192/52.4, 109 F
See application file for complete search history.

(56) References Cited

U.S. PATENT DOCUMENTS

| | | | | |
|---|---|---|---|---|
| 4,856,628 A | * | 8/1989 | Momiyama | 192/3.58 |
| 4,949,264 A | * | 8/1990 | Katayama et al. | 701/67 |
| 4,988,074 A | | 1/1991 | Najmolhoda | 251/129.08 |
| 5,168,973 A | * | 12/1992 | Asayama et al. | 192/85.63 |
| 5,611,370 A | | 3/1997 | Najmolhoda | 137/625.61 |
| 5,957,260 A | * | 9/1999 | Kunii | 192/85.63 |
| 5,984,259 A | | 11/1999 | Najmolhoda et al. | 251/50 |
| 5,996,628 A | | 12/1999 | Najmolhoda et al. | 137/625.61 |
| 6,117,048 A | * | 9/2000 | Toyama | 477/180 |
| 6,179,268 B1 | | 1/2001 | Seid | 251/65 |
| 6,807,472 B2 | | 10/2004 | Ford et al. | 701/58 |
| 2005/0211528 A1 | * | 9/2005 | Hou | 192/85 R |
| 2005/0217398 A1 | * | 10/2005 | Hou et al. | 74/11 |
| 2005/0278102 A1 | * | 12/2005 | Kim et al. | 701/53 |
| 2007/0138422 A1 | | 6/2007 | Najmolhoda et al. | 251/129.14 |
| 2010/0057309 A1 | * | 3/2010 | Ota et al. | 701/51 |

OTHER PUBLICATIONS

Merriam-Webster, Dictionary defintion of Solenoid.*

* cited by examiner

*Primary Examiner* — Kaitlin Joerger
*Assistant Examiner* — Patrick Cicchino

(57) ABSTRACT

A dynamic pressure control system, such as a transmission pressure control system, is provided wherein one or more of electrical current command signals provided to a pressure control solenoid valve, such as a fast response variable force solenoid pressure control valve, are progressively trimmed in a manner to improve overall system pressure control performance by improving the overall commanded current response. The invention permits use of fast response pressure control solenoid valves and obtainment of in a manner to minimize overshoot and improve steady state accuracy, so as to thereby improve precision pressure control.

20 Claims, 6 Drawing Sheets

DYNAMIC PRESSURE CONTROL SYSTEM WITH SOLENOID VALVE COMMAND CURRENT TRIMMING

FIELD OF THE INVENTION

The present invention relates to a dynamic pressure system (hydraulic or pneumatic) where one or more electrical current command signals provided to a variable pressure control solenoid valve is/are subjected to progressive current trimming in a manner to improve overall system pressure control performance by improving the overall commanded current response.

BACKGROUND OF THE INVENTION

Advanced pressure control systems are widely used in modern automatic transmission control strategies. For example, U.S. Pat. No. 6,807,472, Closed Loop Control Of Shifting Clutch Actuators In An Automatic Speed Change Transmission, describes an embodiment of pressure control solenoid valves, pressure sensors and an electronic transmission controller (ETCU) to perform closed loop pressure control as function of input current commands derived from the sensor outputs. Such systems are complex and require extensive tuning for transient response due to the inherent dynamic variation of the hydraulic system coupled with the inductive loads of the generic solenoids used, generally 35 mH solenoid valve devices. As a result, overall system response is less than favorable due to the limitations of ETCU response and accuracy as well as generic solenoid dynamic response.

Extremely precise pressure command steps (i.e. 5 kPa step amplitudes) can sometimes be required depending on the transmission control strategy employed. Depending on the current control strategies utilized, these very small current commands can be hidden in the 'noise' of the closed loop current control. The ETCU (Microprocessor) used to control the input current signal to the solenoid valves is generally a closed loop constant current control based on the conventional P.I.D. methodology, which uses proportional, integral, and/or derivative coefficients to optimize transient current response. The Table below shows the difficulty of tuning the system response and also the limited tuneability of the three parameters, because rise times, overshoot values, and steady state errors are all affected and are interrelated by the coefficients.

| CL | RT | OS | ST | S-S Error |
|---|---|---|---|---|
| Kp | Decrease | Increase | Small Change | Decrease |
| Ki | Decrease | Increase | Increase | Eliminate |
| Kd | Small Change | Decrease | Decrease | (Small Change) | where CL is CL response is controlled response, RT is rise time of electrical currrent signal, OS is overshoot of the current signal, ST is settling time of current signal, and S-S error is steady state current error with respect to command current.

This situation is even further complicated when an extremely fast-responding pressure control solenoid valve is installed in the hydraulic system. The extremely low inductance (approximately 6 mH) of a fast-responding pressure control solenoid valve that uses a permanent magnet and solenoid coil motor (e.g. of the type described in U.S. Pat. No. 4,988,074) can easily respond to the regulation profile of the standard closed loop current control. As a result, the improved response of the high speed solenoid valve actually yields less favorable performance (e.g. instability and commanded pressure error) due to the limitations of the ETCU current control.

SUMMARY OF THE INVENTION

The present invention provides a dynamic pressure control system where one or more of the electrical current command signals provided to a variable pressure control solenoid valve is/are progressively trimmed in a manner to improve overall system pressure control performance by improving the overall commanded current response. The system can comprise a transmission pressure control system having a pressure control solenoid valve, such as a fast response proportional variable force solenoid (VFS) valve, used for clutch control (gear change). However, the invention is not limited thereto and can be incorporated in any dynamic pressure control system (hydraulic or pneumatic) requiring high accuracy and precision in system response.

In an illustrative embodiment of the present invention for a transmission pressure control system including a fast-response pressure control solenoid valve, one or more of the current command signals provided by the ETCU pursuant to a current command control routine is/are progressively trimmed and applied to the control solenoid valve in a manner to minimize overshoot and improve steady state accuracy, so as to thereby improve precision pressure control. For example, in an illustrative working embodiment of the present invention, each total required original current command signal step value is incremented by a modified current control routine of the ETCU into a series of incremental high speed current command steps (as a percentage of the original current command signal step value) and the newly determined incremental current command steps are progressively commanded at a very high rate to the control solenoid valve to transition the current command up to the desired total required command current signal step value. The result is an accurate steady state current that is dynamically more stable (i.e. having lower overshoots) than that provided by a conventional P.I.D. control strategy. In practice of the present invention, the number of incremental current command steps and their amplitudes (e.g. % of original current command step) can be selected so as to tailor the system response to particular dynamic system conditions.

Further details and other advantages of the present invention will be more readily apparent from the following detailed description of the invention taken together with the drawings.

DETAILED DESCRIPTION OF THE INVENTION

The present invention will be described herebelow for purposes of illustration with respect to an automatic transmission pressure control system, FIG. 1, having respective fast-response pressure control solenoid valves, such as a proportional variable force solenoid valves V.F.S., used to control respective clutches of the automatic transmission. The present invention is not limited to such pressure control systems and can be practiced to control any dynamic pressure control system (hydraulic or pneumatic) requiring high accuracy and precision in system response.

Figure 1:
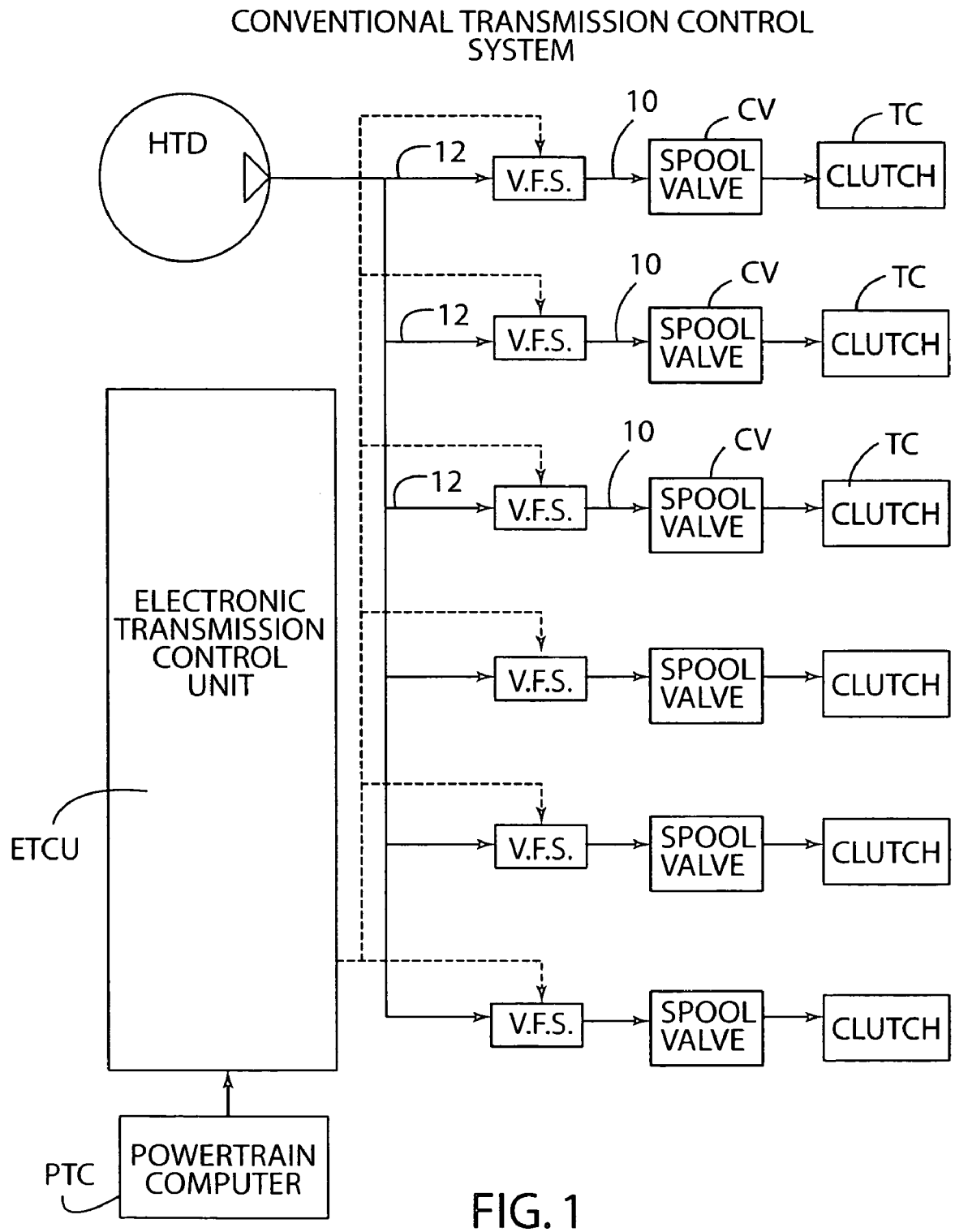
FIG. 1 is a schematic representation of an electronic transmission control system for controlling a vehicle automatic transmission having a plurality of clutches establishing shift points (gear changes) of the transmission.

Referring to FIG. 1, a transmission pressure control system is shown having a conventional powertrain computer PTC communicated to an electronic transmission control unit ETCU modified in accordance with the present invention, which in turn controls respective fast-response pressure control solenoid valves, such as a proportional variable force solenoid valves V.F.S. The powertrain computer PTC monitors certain vehicle operating parameters, such as engine speed, engine torque, etc., and in response sends commands to the ETCU to execute certain transmission functions (e.g. gear changes) at certain times during vehicle operation. The ETCU operates in open loop control to provide one or more current command signals to the respective pressure control solenoid valves V.F.S. to energize them to this end. Each pressure control solenoid valve V.F.S. is associated by a respective fluid conduit 10 with a respective hydraulically actuated transmission clutch TC (fluid pressure actuated component) via a pressure control spool valve CV as shown in FIG. 1. The pressure control solenoid valves V.F.S. are communicated by conduits 12 to a source of pressurized hydraulic fluid, such as a hydraulic pump HYD that can be driven by the transmission, and to a conventional return or sump (not shown).

The pressure control solenoid valves V.F.S. control respective associated pressure control spool valves CV that, in turn, control hydraulic pressure to respective clutches TC of the automatic transmission in a manner to establish the shift points (gear changes) of the automatic transmission. In an alternate embodiment of the invention, high flow direct acting pressure control solenoid valves V.F.S. can be communicated directly to a respective clutch TC without use of a a pressure control spool valve CV.

For purposes of illustration and not limitation, the fast-response proportional pressure control solenoid valves V.F.S. can comprise a fast-responding pressure control solenoid valve having a permanent magnet and solenoid coil motor of the type described in U.S. Pat. Nos. 4,988,074; 5,611,730; 5,996,628; 5,984,259; and 6,179,268 and U.S. patent application Ser. No. 11/314,977, the teachings of which are incorporated herein by reference with respect to construction of the fast-responding solenoid valve. Other types of pressure control solenoid valves can used in practice of the present invention including, but not limited to, high flow direct acting variable force solenoids.

The ETCU includes a computer microprocessor unit having conventional P.I.D. electronic current command control routine (proportional integral deviations software program) which is stored in microprocessor memory and which responds to commands from the powertrain computer PTC to controllably energize (actuate) the solenoid valves V.F.S. However, in accordance with the present invention, the P.I.D. current command control routine is modified by inclusion of a software algorithm in the routine that supplements the conventional ETCU current control routine by dynamically controlling the solenoid current command signal to reduce or minimize overshoot and improve steady state accuracy of the solenoid current command signals. In an illustrative embodiment of the present invention for the transmission pressure control system including fast-responding control solenoid valves V.F.S., one or more of the current command signals provided by the ETCU pursuant to the current command control routine of the invention is/are progressively trimmed and applied to the respective control solenoid valve in a manner to reduce or minimize overshoot and improve steady state accuracy, so as to thereby improve precision pressure control.

Figure 2:
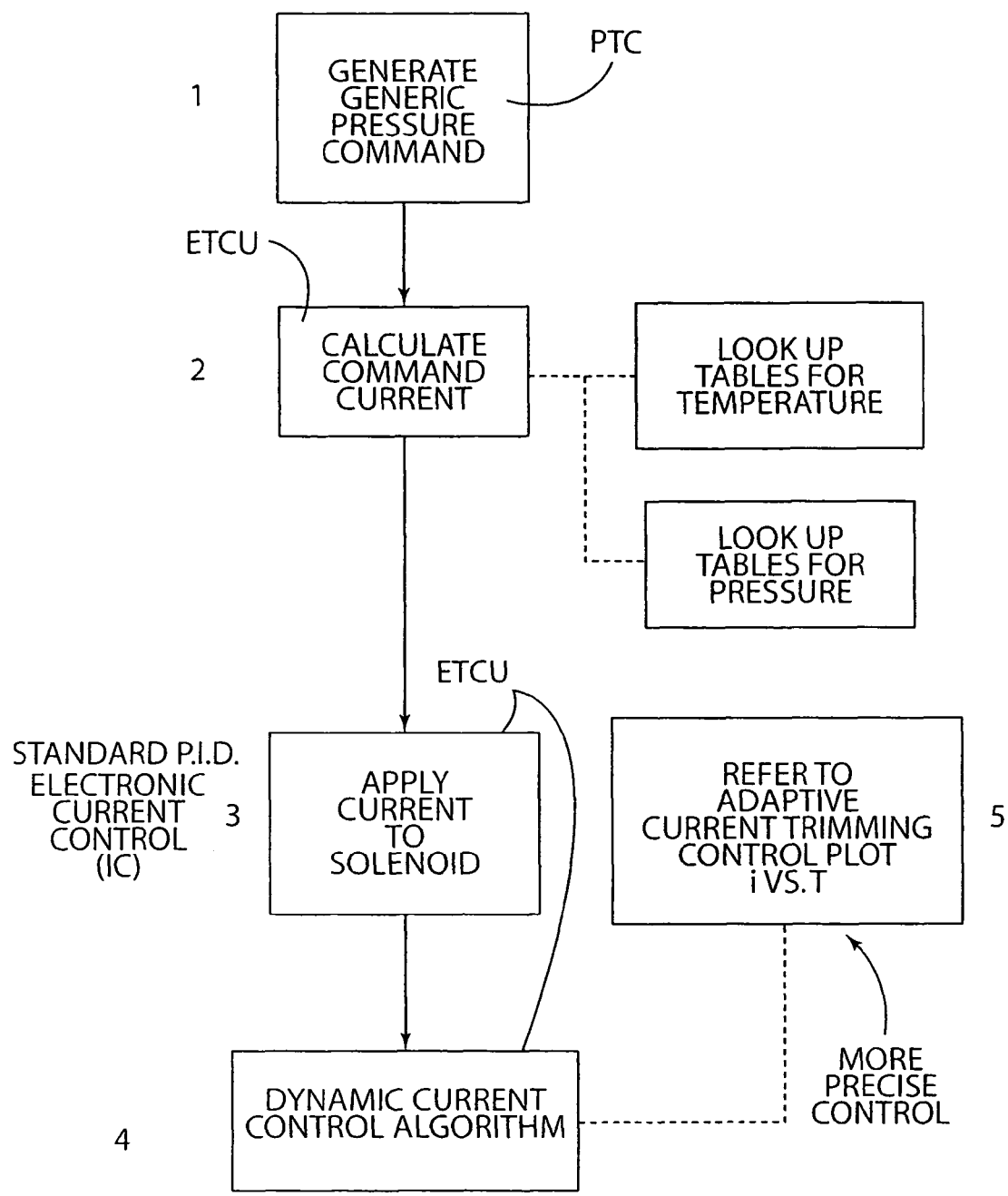
FIG. 2 illustrates a current command control routine pursuant to an illustrative embodiment of the invention for supplementing the normal current command control routine of the ETCU of FIG. 1.

For example, FIG. 2 shows a current command control routine (flow chart) pursuant to an illustrative embodiment of the invention modified to include a software algorithm (step 4) that supplements the conventional ETCU current control routine by dynamically controlling the solenoid current command signal to reduce or minimize overshoot and improve steady state accuracy of the solenoid command current signals.

For purposes of illustration and not limitation, FIG. 2 shows a clutch pressure command generated by a powertrain computer PTC in step 1 and calculated in step 2 as a command current signal by the ETCU. The calculated command current signal is adjusted using a conventional lookup table for temperature of transmission fluid T and using a conventional lookup table for pressure of the transmission fluid P.

In step 3, the ETCU uses its conventional P.I.D. software to calculate a current command signal for a respective pressure control solenoid valve V.F.S. A representative current command signal provided by the conventional ETCU current control routine comprises a series of pulse width modulated signals (in frequency and amplitude as well as signal profile) applied to a respective pressure control solenoid valve V.F.S.

In step 4, the ETCU increments the calculated current command signal using incrementing software algorithm pursuant to the invention and adjusts the calculated incremented current command signal for temperature of transmission fluid and supply pressure by referring to a adaptive current trimming plot of current i versus temperature T. The calculated incremented current command signal then is applied to a respective pressure control solenoid valve V.F.S.

Figure 3A:
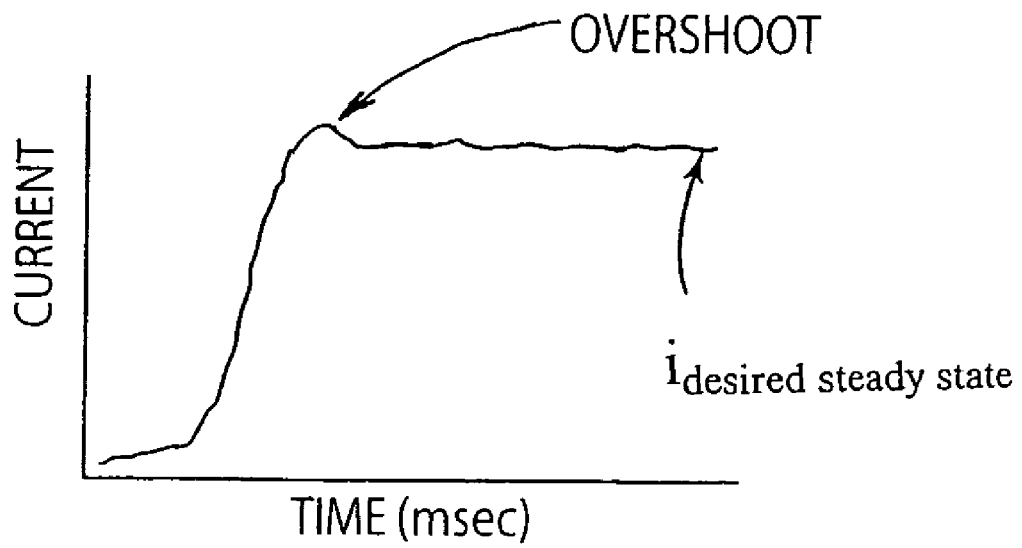
FIG. 3A is a comparison plot of solenoid current versus time of an individual PWM current command pulse signal pursuant to the conventional current command control routine of FIG. 2A showing greater overshoot created by this routine used with the ETCU of FIG. 1. Note for illustrative purposes, the actual PWM signal (or chopper frequency; e.g. 1 kHz) is filtered out in this figure.
Figure 3:
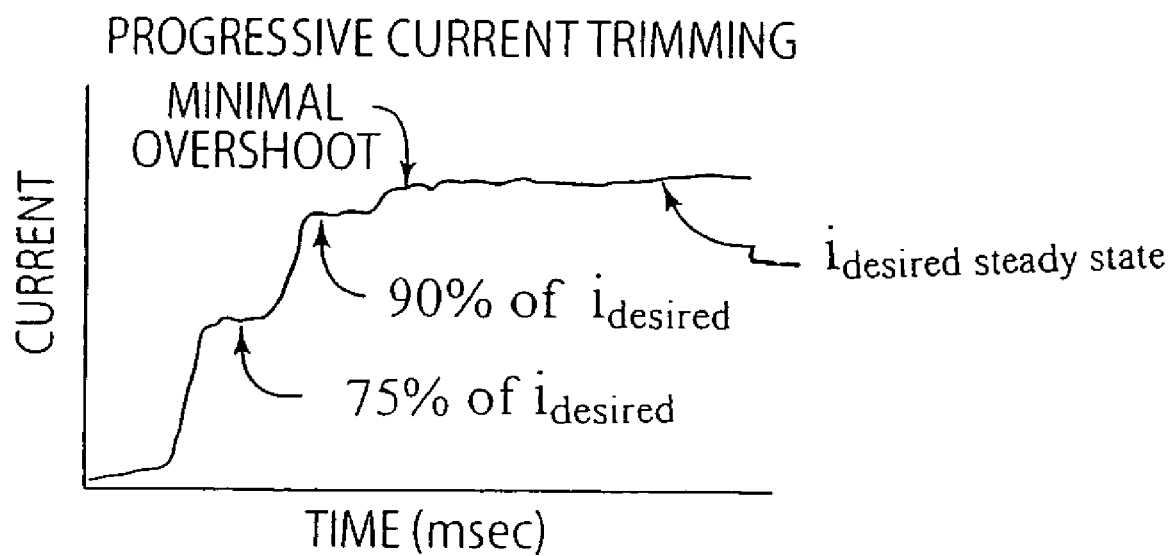
FIG. 3 is a plot of solenoid current versus time of an individual PWM current command pulse signal pursuant to an illustrative embodiment of the invention for use with the ETCU of FIG. 1 providing more accurate steady state current (reduced overshoot). Note for illustrative purposes, the actual PWM signal (or chopper frequency; e.g. 1 kHz) is filtered out in the figure.

Referring to FIG. 3, this algorithm divides or increments the total required current command signal step value into a series of high speed incremental current command steps as a percentage of the original current command signal. The series of newly calculated current steps are progressively commanded at a very high rate to transition the current command to the total current command signal step value. The results in an accurate steady state current that is dynamically more stable (having lower overshoots) than the conventional P.I.D. current control strategy. For example, compare to FIG. 3 illustrating overshoot observed for a conventional current command control routine using a standard current control circuit.

The number of incremental current command steps and their amplitudes (% final total current command) of the original current command signal are variables that can be selected and tailored to specific dynamic conditions of the system. For purposes of illustration and not limitation, the following current command equation can be employed:

$$\text{Current}_{Final} = 0.75 \text{Current}_{Final} + 0.90 \text{Current}_{Final} + \text{Current}_{Final}$$

Such a trimmed current command signal is illustrated in FIG. 3 wherein a series of three (3) high speed incremental current command steps as a percentage of the original current command are shown for a PWM signal. Each incremental current step in the current command is shown to be progressively smaller than the previous one to this end; e.g. 75%, 15% and 10% of the original current command. The series of newly calculated current steps are progressively commanded at a very high rate to transition the current command up to the total command current signal step value in a manner that results in an accurate steady state current that is dynamically more stable (having lower overshoots) than the unmodified conventional P.I.D. current control strategy illustrated in FIG. 3A in use heretofore. The series of newly calculated current steps are progressively commanded at a very high rate, such as less than 6 milliseconds for each incremental step, to provide the high rate transition up to the total current command signal value.

Figure 2A:
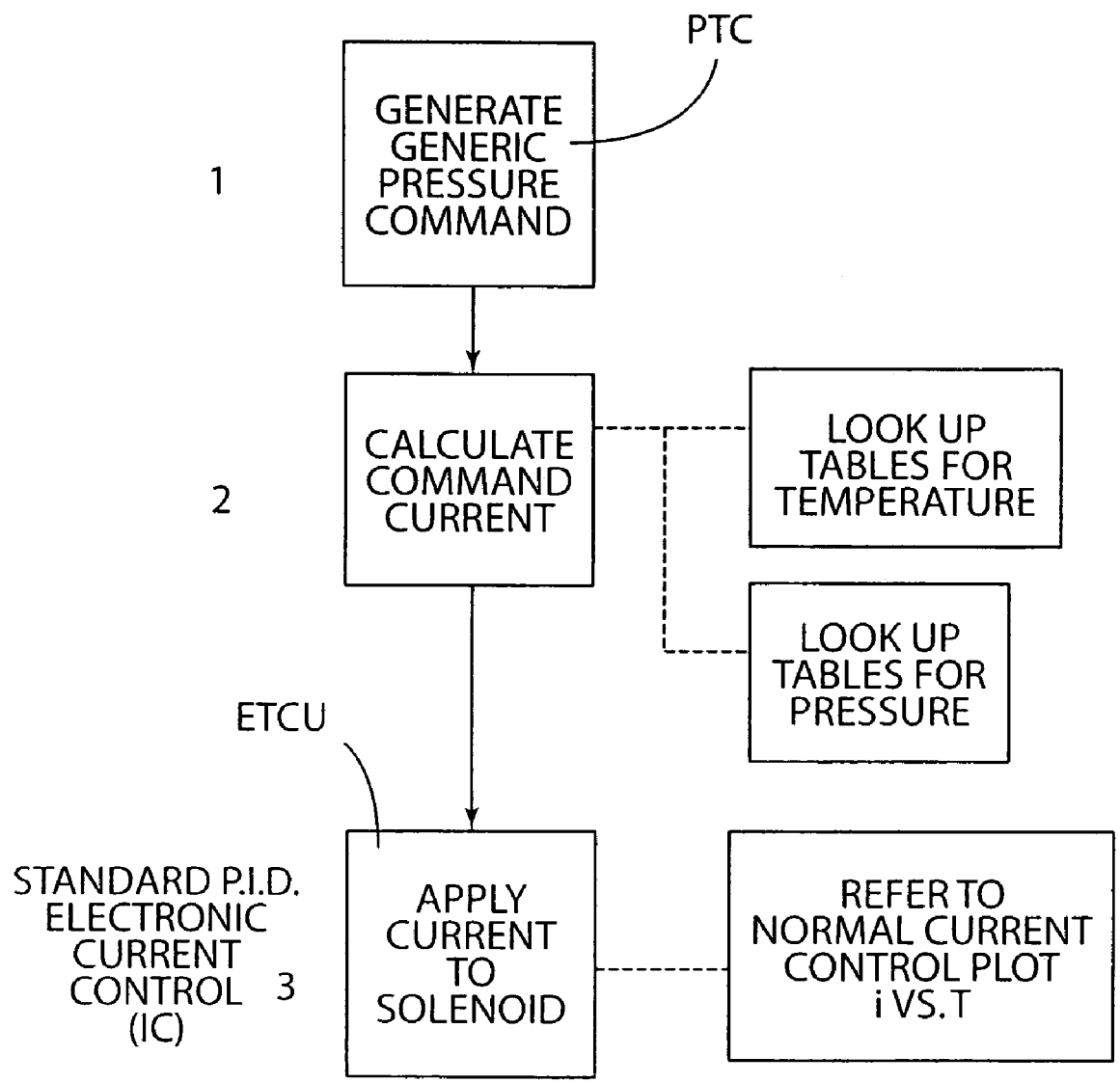
FIG. 2A illustrates a conventional current command routine of the ETCU for comparison.

FIG. 2A illustrates a conventional current control routine of the ETCU in use heretofore for comparison to FIG. 2 pursuant to the invention.

Figure 4:
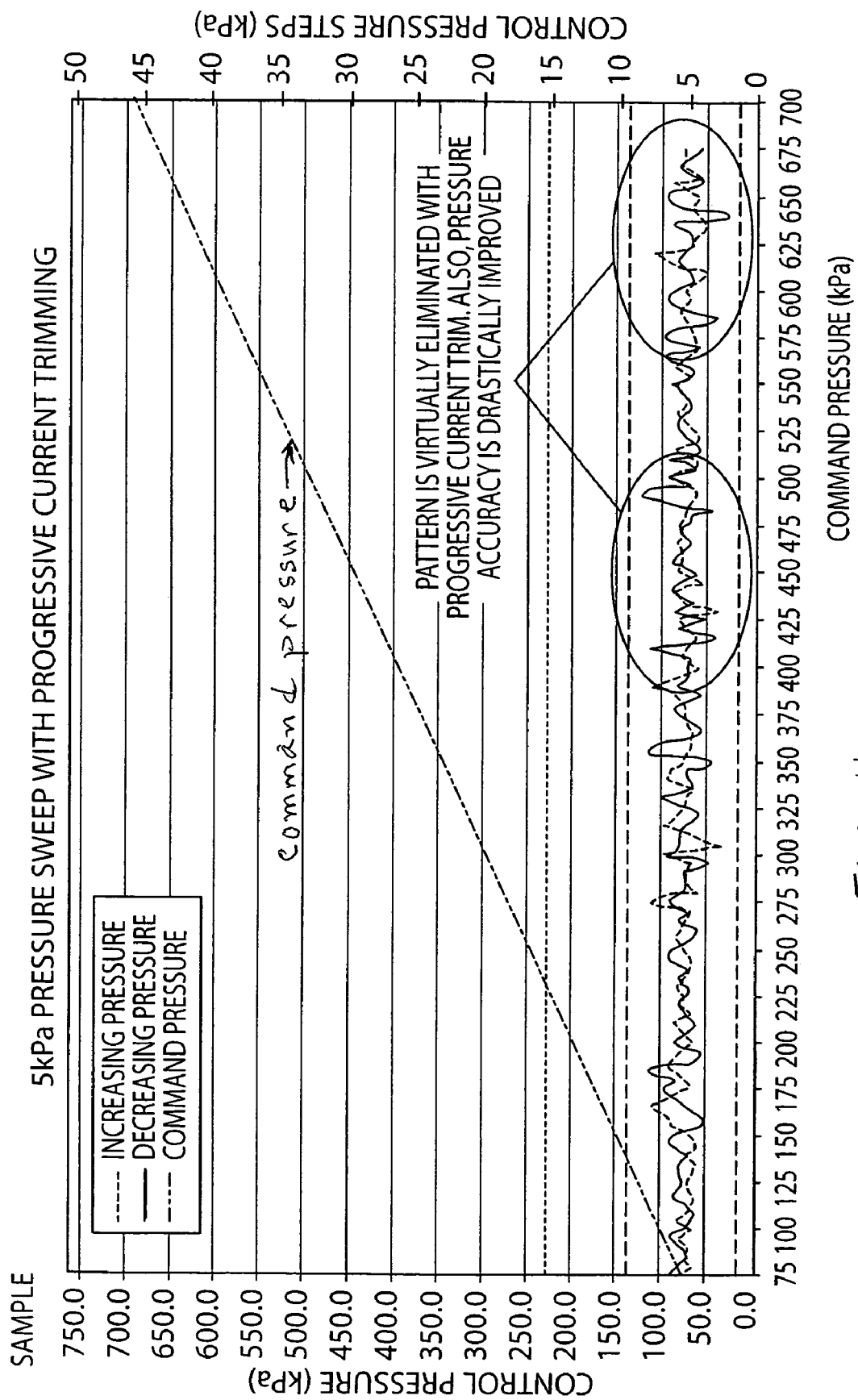
FIG. 4 illustrates a normally low pressure sweep (i.e. increasing and decreasing pressure command steps) for commanded current of a high precision hydraulic control requirement with approximate 5 kPa micro pressure command steps with progressive current trimming pursuant to the invention that significantly reduces the pattern appearing in the output control pressure steps shown in FIG. 4A.
Figure 4A:
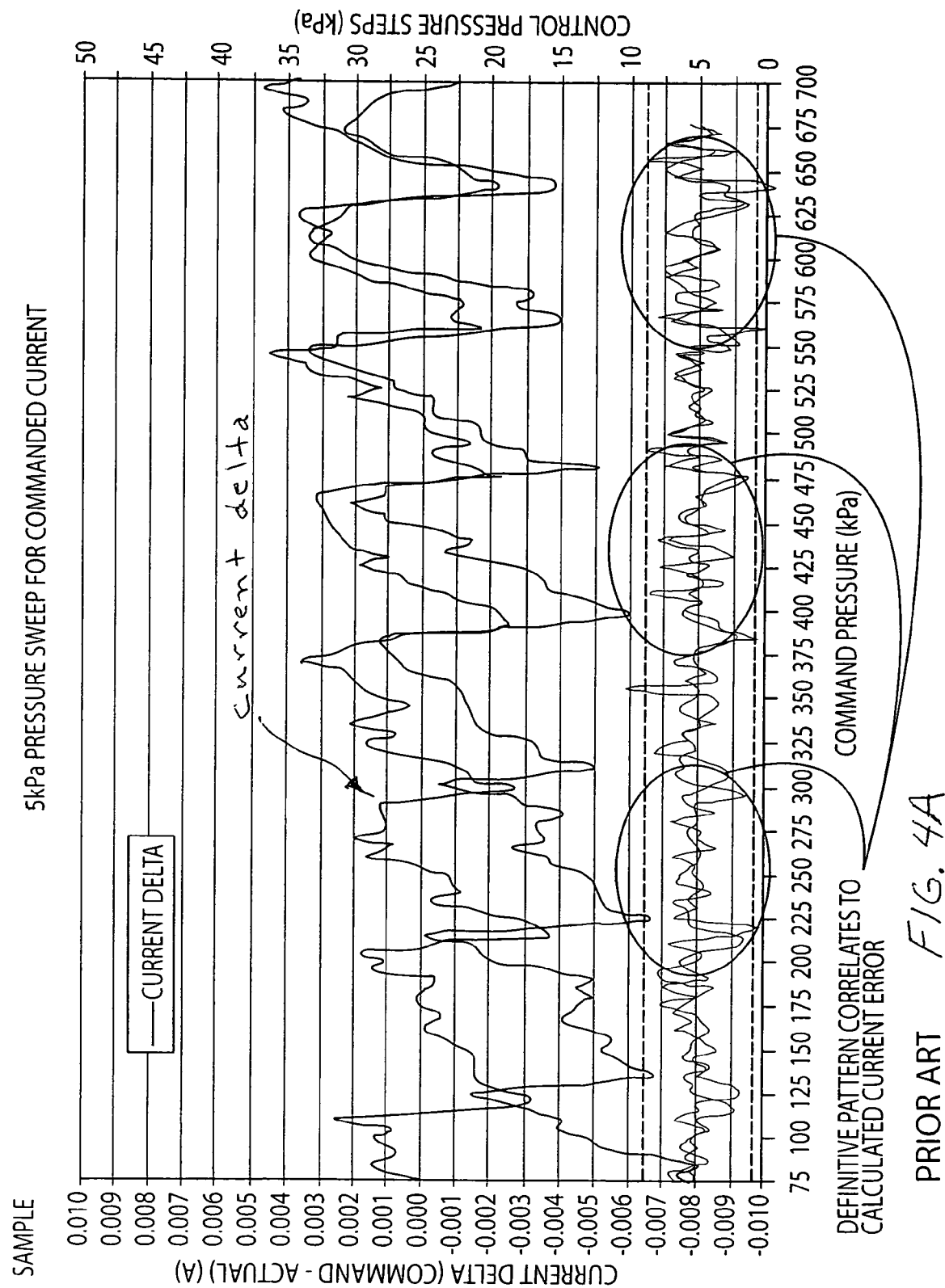
FIG. 4A illustrates for a standard current control circuit an observed pattern appearing in the output control pressure steps that correlates directly with current delta or error for a similar normally low pressure sweep of the type with a control requirement of approximate 5 kPa micro pressure command steps.

FIG. 4 illustrates a normally low pressure sweep (i.e. increasing and decreasing pressure command steps) for commanded current of a high precision hydraulic control requirement with approximate 5 kPa micro pressure command signals (steps) with progressive current trimming pursuant to the invention that significantly reduces the pattern appearing in the output control pressure steps shown in FIG. 4A. With respect to FIG. 4, a series of current command signals are provided to achieve control of the dynamic command pressure (increase/decrease) as shown in the figure. One or more (e.g. one, some, or all) of the current command signals of the series can be of the trimmed type illustrated in FIG. 3 to achieve the command pressure control shown. Typically, all of the current command signals in the series to achieve the command pressure control shown in FIG. 4 are trimmed as shown in FIG. 3, although as mentioned the invention is not so limited as one or more of the current command signals in a series can be of the type shown in FIG. 3.

FIG. 4A illustrates the observed pattern appearing in the output control pressure steps that correlates directly with current delta or error for a similar normally low pressure sweep of the type with a control requirement of approximate 5 kPa micro pressure command signals (steps) for a standard current control circuit in use heretofore.

FIG. 4 illustrates that pressure control accuracy is significantly improved by practice of the present invention as a result of improvement of current control characteristics. This improvement provides the pressure control system with a desired smooth, predictable and consistent change in pressure for a given current command.

Practice of the invention using the progressive current trimming method greatly improves the system accuracy by improving current control characteristics and permits use of a fast response pressure control solenoid valve and provides greater flexibility in terms of providing a more stable pressure command strategy across a large temperature and pressure spectrum of the transmission fluid. In particular, practice of the invention by progressively trimming of the ETCU current control routine signals to the control solenoid valves in the manner described above reduces or minimizes overshoot and improves steady state accuracy, so as to thereby improve precision pressure control. The invention is not limited to the algorithm above and can be practiced using other dynamic trimming equations to modify the conventional P.I.D. current control routine signal of the ETCU to achieve advantages of the invention.

Although the present invention has been described with respect to certain embodiments of the invention, those skilled in the art will appreciate that the modifications and changes can be made thereto without departing from the spirit and scope of the invention as set forth in the appended claims.

We claim:

1. A dynamic fluid pressure control system having a fluid actuated component, a pressure control solenoid valve for controlling fluid pressure to the component, and an electronic control unit providing electrical current command signals to the control solenoid valve wherein one or more of the current command signals is/are progressively trimmed in incremental manner to provide incremental current steps thereof that reduce or eliminate overshoot of the current command signal to the control solenoid valve.

2. The control system of claim 1 which comprises a transmission pressure control system wherein a respective pressure control solenoid controls a respective clutch.

3. The system of claim 1 wherein the control solenoid valve comprises a fast-response variable force solenoid valve having a permanent magnet and solenoid coil.

4. The system of claim 1 wherein the one or more of the current command signals is/are trimmed to have progressively smaller incremental current steps to transition to a desired total current command signal.

5. A dynamic fluid pressure control system having a fluid actuated component, a pressure control solenoid valve for controlling fluid pressure to the component, and an electronic control unit providing electrical current command signals to the control solenoid valve wherein one or more of the current command signals is/are progressively trimmed as a series of incremental current steps that reduce or eliminate overshoot of the current command signal to the control solenoid valve.

6. The system of claim 5 wherein the incremental current steps of a respective current command signal are provided as a percentage of an original current command signal step value determined by the control unit.

7. The system of claim 5 wherein the series of incremental current steps are progressively commanded at a very high rate of less than 6 milliseconds to a respective control solenoid valve.

8. The system of claim 5 wherein the control unit employs a P.I.D. current control routine that is modified by an algorithm that increments the current command signal into the series of incremental current steps.

9. The system of claim 8 wherein the one or more current command signals is/are incremented to have progressively smaller incremental steps to transition to a desired total current command signal.

10. The system of claim 5 wherein the fluid actuated component comprises a clutch.

11. A dynamic pressure transmission control system having a plurality of hydraulically actuated clutches, a respective pressure control solenoid valve associated with a respective clutch, and a transmission electronic control unit providing electrical current command signals to the respective control solenoid valve wherein one or more of the current command signals provided to each control solenoid valve is/are provided as a series of incremental current steps that reduce or eliminate overshoot of the current command signal to the respective control solenoid valve.

12. The system of claim 11 wherein the incremental current steps of a respective current command signal are provided as a percentage of an original current command signal step value determined by the control unit.

13. The system of claim 11 wherein the series of incremental current steps are progressively commanded at a very high rate of less than 6 milliseconds to a respective control solenoid valve.

14. The system of claim 11 wherein the control unit employs a P.I.D. current control routine that is modified by an algorithm that increments the current command signal into the series of incremental current steps.

15. The system of claim 11 wherein the one or more current command signals is/are incremented to have progressively smaller incremental steps to transition to a desired total current command signal.

16. A method of controlling a dynamic fluid pressure control system having a fluid actuated component, a pressure control solenoid valve for controlling fluid pressure to the component, and an electronic control unit providing electrical current command signals to the control solenoid valve, wherein one or more of the current command signals is/are progressively trimmed in incremental manner to provide incremental current steps thereof that reduce or eliminate overshoot of the current command signal to the control solenoid valve.

17. The method of claim 16 wherein the control system comprises a transmission pressure control system wherein a respective pressure control solenoid valve controls a respective clutch.

18. The method of claim 17 wherein the control solenoid valve comprises a fast-response variable force solenoid valve having a permanent magnet and solenoid coil.

19. The method of claim 16 wherein the one or more of the current command signals is/are trimmed to have progressively smaller incremental steps to transition to a desired total current command signal.

20. A method of controlling a dynamic pressure transmission control system having a plurality of hydraulically actuated clutches, a respective pressure control solenoid valve associated with a respective clutch, and a transmission electronic control unit providing electrical current command signals to the respective control solenoids, comprising providing one or more of the current command signals from the control unit to a respective solenoid valve wherein the one or more of the command signals is/are progressively trimmed in incremental manner to provide incremental current steps thereof that reduce or eliminate overshoot of the current command signal to the respective control solenoid valve.

* * * * *